US007935922B2

(12) United States Patent
Gonin et al.

(10) Patent No.: US 7,935,922 B2
(45) Date of Patent: May 3, 2011

(54) ION GUIDE CHAMBER

(75) Inventors: Marc Gonin, Thun (CH); Katrin Fuhrer, Thun (CH)

(73) Assignee: Tofwerk AG, Thun (CH)

( * ) Notice: Subject to any disclaimer, the term of this patent is extended or adjusted under 35 U.S.C. 154(b) by 444 days.

(21) Appl. No.: 12/044,059

(22) Filed: Mar. 7, 2008

(65) Prior Publication Data

US 2008/0217528 A1 Sep. 11, 2008

(30) Foreign Application Priority Data

Mar. 8, 2007 (EP) .................................... 07405077

(51) Int. Cl.
*B01D 59/44* (2006.01)

(52) U.S. Cl. ......................... 250/290; 250/288; 250/292

(58) Field of Classification Search ................... 250/290
See application file for complete search history.

(56) References Cited

U.S. PATENT DOCUMENTS

| | | | | |
|---|---|---|---|---|
| 4,963,736 | A | 10/1990 | Douglas et al. | |
| 5,248,882 | A | 9/1993 | Liang | |
| 5,598,001 | A | 1/1997 | Flory et al. | |
| 5,847,386 | A | 12/1998 | Thomson et al. | |
| 6,075,244 | A | 6/2000 | Baba et al. | |
| 6,111,250 | A * | 8/2000 | Thomson et al. | 250/282 |
| 6,140,638 | A | 10/2000 | Tanner et al. | |
| 6,586,727 | B2 | 7/2003 | Bateman et al. | |
| 6,593,570 | B2 * | 7/2003 | Li et al. | 250/290 |
| 6,627,912 | B2 | 9/2003 | Bandura et al. | |
| 6,674,071 | B2 | 1/2004 | Franzen et al. | |
| 6,800,851 | B1 | 10/2004 | Zubarev et al. | |
| 6,900,431 | B2 | 5/2005 | Belov et al. | |
| 7,034,292 | B1 * | 4/2006 | Whitehouse et al. | 250/289 |
| 7,064,322 | B2 | 6/2006 | Crawford et al. | |
| 7,081,618 | B2 * | 7/2006 | Laprade | 250/286 |
| 7,309,861 | B2 * | 12/2007 | Brown et al. | 250/290 |
| 7,498,569 | B2 * | 3/2009 | Ding | 250/282 |

(Continued)

FOREIGN PATENT DOCUMENTS

EP 1643536 A2 4/2006

(Continued)

OTHER PUBLICATIONS

Dodonov, A. et al., A new Technique for Decomposition of Selected Ions in Molecule Ion Reactor Coupled with Ortho-Time-of-flight Mass spectrometry, Rapid Communications in Mass Spectrometry, vol. 11, pp. 1649-1656, 1997.

(Continued)

*Primary Examiner* — Phillip A Johnston
(74) *Attorney, Agent, or Firm* — Jacox, Meckstroth & Jenkins

(57) ABSTRACT

An ion guide chamber comprising a gas-tight elongate chamber, at least one first electrode for generating a field for transporting ions along the elongate chamber and at least one second electrode for generating a field for focusing ions within the elongate chamber. The elongate chamber, e. g. constituted by a glass tube, comprises a resistive structure extending substantially along a main axis of the chamber, whereas the first electrode is constituted by the resistive structure. Furthermore, the second electrode is arranged outside the elongate chamber. Having the RF electrodes arranged outside the vacuum chamber, provides a mechanically simple solution as well as insuring that contamination of the RF electrodes to the analyte gas cannot occur. This allows for a cost-saving design of the RF electrodes and with the corresponding voltages outside the chamber, preferably at atmospheric pressure or high vacuum, avoids discharges within the tube.

17 Claims, 3 Drawing Sheets

U.S. PATENT DOCUMENTS

| | | | |
|---|---|---|---|
| 2001/0052569 | A1 | 12/2001 | Bateman et al. |
| 2003/0136905 | A1 | 7/2003 | Franzen et al. |
| 2004/0183007 | A1 | 9/2004 | Belov et al. |
| 2005/0001163 | A1 | 1/2005 | Belov et al. |
| 2006/0071162 | A1 | 4/2006 | Crawford et al. |
| 2006/0169890 | A1 | 8/2006 | Crawford et al. |
| 2008/0149825 | A1 | 6/2008 | Kozlovski et al. |

FOREIGN PATENT DOCUMENTS

| | | |
|---|---|---|
| EP | 1933365 | 6/2008 |
| EP | 1933366 | 6/2008 |

OTHER PUBLICATIONS

Douglas, D. J. et al., Collisional Cooling Effects in Radio Frequency Quadrupoles, American Society for Mass Spectrometry, pp. 398-408, 1992.

Gerlich, D.—"Inhomogeneous RF Fields: A Versatile Tool for the Study of Processes with Slow Ions", State-Selected and State-to-State Ion-Molecule Reaction Dynamics. Part 1: Experiment; Advances in Chemical Physics Series; vol. LXXXII, 1992.

Hoffmann E. et al.—"The ICP-ToF Mass Spectrometer: An Alternative for Elemental Analysis", Spectroscopy Europe, vol. 17, No. 1, pp. 16-23, 2005.

Landau, L.D. and Lifshitz, E.M.—Mechanics, 3rd Edition (vol. 1 of Course of Theoretical Physics), pp. 93-95; First published by Pergamon Press plc 1960.

Raznikov V. et al.—Ion Rotating Motion in a Gas-Filled Radio-Frequency Quadrupole Ion Guide as a New Technique for Structural and Kinetic Investigations of Ions; Rapid Communications in Mass Spectrometry; pp. 1912-1921; 2001.

Watson J. et al.—"A Technique for Mass Selective Ion Rejection in a Quadrupole Reaction Chamber", International Journal of Mass Spectrometry and Ion Processes; pp. 225-235, 1989.

* cited by examiner

ION GUIDE CHAMBER

BACKGROUND OF THE INVENTION

1. Field of the Invention

The invention relates to an ion guide chamber, comprising an elongate chamber, at least one first electrode for generating a field for transporting ions along said elongate chamber and at least one second electrode for generating a field for focusing the ions within the elongate chamber. The invention further relates to an apparatus for mass analysis comprising such an ion chamber.

2. Description of the Related Art

Mass spectrometry (MS) is a method of analysis that can be applied in a wide field of different applications. MS can be used for chemical and biological analysis in many different fields, including the analysis of gases, liquids, solids, plasmas, aerosols, biological aerosols, biological material, tissue, and so forth.

Mass spectrometry involves the measurement of the mass-to-charge ratio of ions. In many applications these ions are created in high pressure ion sources. Many mass analyzing devices however require that the ions are injected into a high vacuum chamber. Therefore, it has been proposed to transfer the ions from the high pressure ion source into the high vacuum through an intermediate pressure region. Often, the ions have to pass one or several differentially pumped stages for the transfer into the high vacuum of the MS.

It is desirable that this transfer of ions is efficient, e.g. with little loss of ions. Various methods have been used to optimize the transmission. Since the differential pumping stages often consist of one or several orifices or capillaries through which the ions have to be transferred, many of the inventions for increasing ion transmission incorporate ways to retain the ions close to the ideal ion path connecting those orifices and capillaries.

This is often accomplished with an ion guide chamber that holds two superimposed fields. A first field is used for transport of ions through the residual gas from the entrance to the exit. For this, the field direction is essentially parallel to the chamber main axis, and the field can be static. A second electric field is applied for confining the ions close to the axis. This is often done with an RF field with low amplitudes on the chamber axis and larger amplitudes away from the axis. Such an RF field creates an effective potential confining the ions to the axis. Examples of such fields are RF multipole fields. The transport field controls the axial ion movement and directs the ions towards the exit orifice into the (next) higher vacuum, whereas the RF field confines the ions to the center axis within the chamber.

An example of such a device is described in U.S. Pat. No. 4,963,736 (MDS Inc.) as well as in Douglas J. D. and French J. B., Collisional Cooling effects in radio frequency quadrupoles, J. Am. Soc. Mass Spectrom. 3, 398, 1992. It uses radio frequency (RF) fields, which can focus the ions along an axis and additionally can cool the ions through collisions to further increase transmission efficiencies into the mass spectrometer. The fields are generated by elongated rods that are arranged within the vacuum chambers.

Another device is described in U.S. Pat. No. 5,847,386 (MDS Inc.) and in Dodonov A., Kozlovsky V., Loboda A. Raznikov V., Sulimenkov I., Tolmachev A., Kraft A., Wollnik H., A new Technique for Decomposition of Selected Ions in Molecule Ion Reactor Coupled with Ortho-Time-of-flight Mass spectrometry, Rap. Comm. In Mass Spec., 11, 1649-1656, 1997. This device also uses an RF quadrupole but also has a superimposed linear field along the RF Quadrupole by segmenting the quadrupole. This allows to control ion energies and to decrease the residence time in the quadrupole. Again, the quadrupole rod sets are arranged within the vacuum chamber.

In still other devices the superposition of a linear field and an RF field is achieved by tilting the quadrupole electrodes towards the central axis, or by using quadrupole electrodes of tempered shape instead of cylindrical shape.

The geometry of the prior art vacuum chambers and rods is rather complex. Furthermore, one has to make sure that contamination of the RF electrodes to the analyte gas held in the vacuum chambers, e. g. due to outgassing, does not occur. This sets high demands on the RF electrode material. Furthermore, breakdown voltages are very low at intermediate pressures as they are used within the vacuum chambers described above. Therefore, discharges may be provoked by the RF electrodes arranged within the chambers.

SUMMARY OF THE INVENTION

It is the object of the invention to create an ion guide chamber pertaining to the technical field initially mentioned that is mechanically simple, cost-efficient and that allows for good transmission of analyte ions generated at elevated pressure to the mass spectrometer, undisturbed by discharges or electrode contamination, thereby ensuring high sensitivity and detection limits of the mass analysis.

The solution of the invention is specified by the features of claim 1. According to the invention the elongate chamber comprises a resistive structure extending substantially along a main axis of the chamber, whereas the first electrode, i. e. the electrode for generating the field for transporting the ions along the elongate chamber, is constituted by the resistive structure. The second electrode for generating the field for focusing the ions within the elongate chamber is arranged outside the elongate chamber.

The geometry of the invention, having the RF electrodes arranged outside the vacuum chamber, provides a mechanically simple solution.

The transporting field controls ion energies, which allows controlling fragmentation, and decreases residence times, which is often desired in hyphenated MS techniques.

Therefore, an apparatus for mass analysis according to the invention comprises:

at least one ion guide chamber;

a first voltage generating device connected to the at least one first electrode for generating the field for transporting the ions;

a second voltage generating device connected to the at least one second electrode for generating the field for focusing the ions; and a mass spectrometer, in particular a time-of-flight mass spectrometer, arranged downstream of the at least one ion guide chamber.

Several ion guide chambers may be arranged in series in order to allow for efficient ion transfer through several stages of differential pumping or to perform different functions.

Preferably, the elongate chamber is gas-tight. This allows for a particularly simple design. Furthermore, having the electrodes outside the gas-tight glass tube has the big advantage that contamination of the RF electrodes to the analyte gas cannot occur. This allows for a cost-saving design of the RF electrodes. Furthermore, having the RF electrodes with the corresponding voltages outside the chamber, preferably at atmospheric pressure or at high vacuum, minimizes the discharge problem mentioned above.

Alternatively, for elongate chambers that are not gas-tight, they may be utilized within vacuum chambers. Even in this case, gases will not enter into the chamber because the pressure within the chamber will be higher than outside. Therefore, contamination of the RF electrodes to the analyte gas is again avoided.

Due to the fact that the inventive ion guide chamber or each of the subsequently arranged inventive ion guide chambers, respectively, allows for decreasing the pressure the inventive device is particularly suitable for guiding ions from high pressure ion sources arranged upstream of the at least one ion guide chamber to the mass spectrometer arranged downstream of the at least one ion guide chamber.

In one preferred embodiment the inventive ion guide is used as an ion mobility separation device. For this purpose, an ion gate may be arranged upstream of the at least one ion guide tube. The ion guide tube is operated at elevated pressure such that the ions injected into the ion guide tube are separated according to their collision cross section and charge state. The ion gate is operated in a pulsed manner such that the analyte ions enter the ion guide tube in a corresponding pulsed manner. The different ion species have different drift times in the tube. At the exit of the tube they are transferred into the mass spectrometer where their m/Q is analyzed. The chamber of this invention allows for minimal losses due to diffusion. Furthermore, the inventive layout allows for creating a very homogenous transporting field which improves the performance of the ion mobility separation stage.

As an alternative, the analyte ions are directly generated in a pulsed manner by the ion source. This saves the upstream ion gate.

In another embodiment the ion guide chamber is operated as an ion source, i. e. the analyte ions are formed within the ion guide chamber by photo ionization or by any other ionization techniques that can take place under elevated pressure.

In yet another embodiment the ion guide chamber is used as a reaction chamber. For that purpose it preferably features a first inlet for analyte molecules and a second inlet for a primary particle beam. Because of the RF confinement of the primary ions, their ion density and thus numbers of reaction products are increased in the center axis of the tube. The analyte ions are mainly generated along the axis and their probability to be transferred through the exit orifice into the high vacuum is therefore high.

The reaction chamber described above can serve different purposes. Often the sample is embedded in a much more abundant matrix that is of no interest in the analysis. For example, when analyzing air quality the major air components $N_2$, $O_2$ and Ar are usually of no analytical interest. In such a case it is of advantage to use selective ionization that only ionizes the trace gases of interest but not the major components. Ionizing the major components would create a vast amount of ions that could saturate the MS system and hinder the detection of the trace ions. Several selective ion sources have been developed for this reason. Among them are single photon ionization (SPI), metastable atom beam ionization (MAB), and a large variety of ionization schemes by chemical reactions where selective reactions are used to ionize the trace samples but not the matrix.

Preferably, the elongate chamber is constituted by a glass tube, in particular of circular cross-section. The tube can be bent, which is sometimes required in order to transport ions from non-coaxial orifices or in order to minimize the flux of photons through the orifices.

Alternatively, the cross-section of the tube is not circular, but e. g. rectangular. Instead of glass the tube may be manufactured from another material, in particular of plastic or ceramics.

The resistive structure may be constituted by a resistive coating on the inside and/or outside of the elongate chamber, in particular in cases where the elongate chamber is made from an isolating material such as e. g. isolating glass. It is preferred to apply the coating to the outside of the elongate chamber only as this allows for using paints that are not necessarily free of outgassing. The coating can be applied on the whole surface or in the form of structures as for example a spiral extending along the tube.

In another embodiment the invention is realized with a chamber made from a resistive material such as resistive glass, resistive plastic or resistive ceramics. This makes an additional coating unnecessary.

In any case, applying a voltage along the tube will generate the transporting field along the tube axis. It is advantageous to use large area transport field electrodes covering a substantial part (preferably at least half) of the generated surface of the chamber as this allows for generating smooth electric fields.

Preferably, a resistance measured along the chamber main axis, between a first end of the resistive structure and a second end of the resistive structure opposite to the first end is at least 1 MΩ, preferably at least 5 MΩ. This ensures that the field for focusing the ions generated by the second electrode arranged outside the elongate chamber may penetrate into the chamber. At the same time, reliable transport of the ions along the chamber is provided for.

In a preferred embodiment the at least one second electrode comprises a set of elongated rods arranged substantially parallel to the elongated chamber. The rods may be conducting or semi conducting. Their cross-section may be e. g. circular or parabolic.

Alternatively, the at least one second electrode is constituted by at least one electrically conductive or semi-conductive coated or painted surface region on an outside of the elongated chamber. Again, due to the fact that the electrode is arranged outside the chamber problems due to outgassing electrode materials are avoided. Furthermore, using a painted electrode allows for a design of the ion guide chamber that is at the same time very compact and robust. Neither is there a need for rod fixtures, nor is it necessary to adjust and/or calibrate focusing electrodes with respect to the guide chamber.

Preferably, the field for transporting the ions runs parallel to the chamber main axis and the field for focusing the ions is an RF multipole field generating an effective potential confining the ions to a region neighboring the chamber main axis. In principle the primary confining field may also consist of a superposition of multipole fields.

It is known that an oscillatory inhomogeneous electrical field forms a so-called effective potential which is proportional to $E^2$, where E is the amplitude of the electrical field strength oscillations (see e. g. Landau L. D., Lifshitz E. M.: Mechanics, Pergamon Press, Oxford 1976; Gerlich, D. "Inhomogeneous Electrical Radio Frequency Fields: A Versatile Tool for the Study of Processes with Slow Ions" in: State-Selected and State-to-State Ion-Molecule Reaction Dynamics, edited by C. Y. Ng and M. Baer. Advances in Chemical Physics Series, LXXXII, 1, 1992). In case of a quadrupolar RF electrical field the effective potential results in a net force on the ion towards the quadrupole axis. This force is inverse proportional to the ion mass-to-charge ratio (m/Q) and directly proportional to the ion distance from the quadrupole axis. This fundamental property of the effective potential results in that an ion with a given m/Q will perform slow oscillations around the quadrupole axis with a characteristic frequency which is inversely proportional to its m/Q, i. e. the quadrupole field and similarly higher multipole fields are confining fields suitable for the mass filter according to the invention.

Linear RF multipole fields that are particularly well adapted for the inventive ion guide are usually produced using co-axial rods of parabolic or circular shape. Other shapes may be used e. g. in order to approximate quadrupole fields. Preferably, a primary RF-only field is applied between opposing set of rods.

In a particularly preferred embodiment the second field generating device is capable of generating a rotating multipole field at the at least one second electrode, in particular a rotating quadrupole field. In principle, the utilization of such fields is known, e. g. from fundamental kinetic studies (see V. V. Raznikov, I. V. Soulimenkov, V. I. Kozlovski, A. R. Pikhtelev, M. O. Raznikova, Th. Horvath, A. A. Kholomeev, Z. Zhou, H. Wollnik, A. F. Dodonov; Ion rotating motion in a gas-filled radio-frequency quadrupole ion guide as a new technique for structural and kinetic investigations of ions; Rapid Communications in Mass Spectrometry; Volume 15, Issue 20, Pages 1912-1921). When properly tuned, such a rotating field can result in an ion motion orbiting around the central axis. The orbit diameter is dependent on the m/Q ratio of the ions. Ions with higher m/Q will have a smaller orbit diameter and therefore a higher chance of finding the chamber exit. Low m/Q ions will have a larger orbit diameter and therefore will no longer be able to exit the chamber and therefore their transmission to the MS is decreased. This method requires elevated gas pressures where the ion oscillations are strongly damped by gas collisions.

Operating the RF field in a rotating mode as described above allows to increase the transfer rate of high m/Q analyte ions which stay closer to the chamber axis, while keeping the low m/Q primary ions on higher orbits and thereby reducing their ability to exit the chamber. This will minimize saturation effects in the mass analyzer due to abundant primary ions.

In another embodiment of the invention, the second field generating device is capable of generating an additional excitation RF field to be super-positioned to a confining RF field.

In this case, the ion guide tube is operated at lower pressure and the second field generating device is preferably designed in such a way that the superimposed RF frequency is generated such that ions belonging to one or several narrow bands of m/Q are exited onto an orbit around the center axis. This will hinder their exiting the exit orifice. For this purpose, one or several additional small amplitude RF fields are superimposed to the primary RF field. The frequencies of the additional fields must be adjusted to the characteristic oscillation frequencies of the ions to be eliminated in the primary RF field. The ions with the corresponding m/Q will be gradually resonantly excited by the low amplitude RF fields. Again, a rotating multipole field is preferable because it will bring the ions into an orbit around the chamber axis.

Especially when the device is used as an ion source or as a reaction chamber it is sometimes desirable to discriminate certain ranges of m/Q ions.

Ions in a RF field will do fast oscillations in the frequency of the confining RF field. High m/Q ions will have lower amplitudes for these fast oscillations. This can be used to increase the density of high m/Q ions on the chamber axis relative to the density of low m/Q ions. This also holds at elevated pressures where ion oscillations are damped by gas collisions. Similarly, it is possible to use the low m/Q cut-off of RF-only multipole fields to hinder low m/Q ions exiting the chamber.

Other advantageous embodiments and combinations of features come out from the detailed description below and the totality of the claims.

BRIEF DESCRIPTION OF THE ACCOMPANYING DRAWINGS

The drawings used to explain the embodiments show:

In the figures, the same components are given the same reference symbols.

DETAILED DESCRIPTION OF THE PREFERRED EMBODIMENTS

Figure 1:
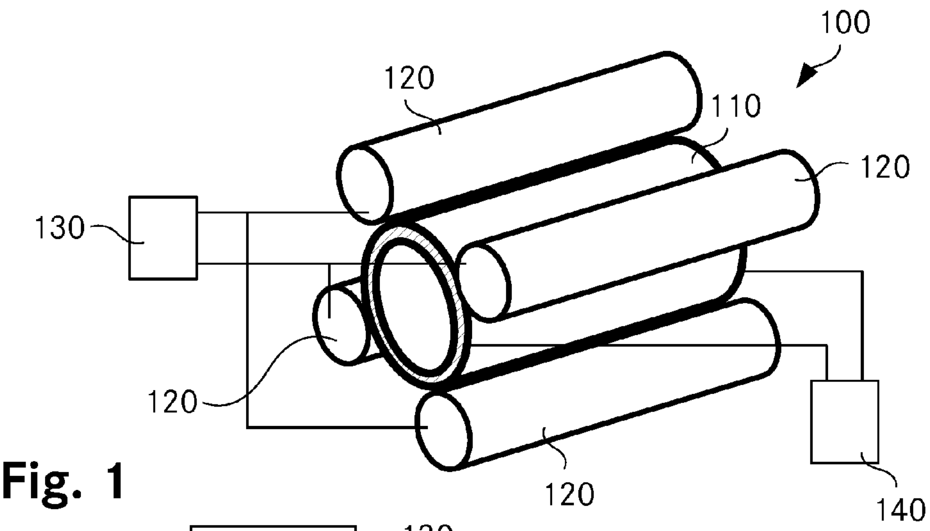
FIG. 1 is a three-dimensional view of a first embodiment of an ion guide chamber according to the invention.
Figure 2:
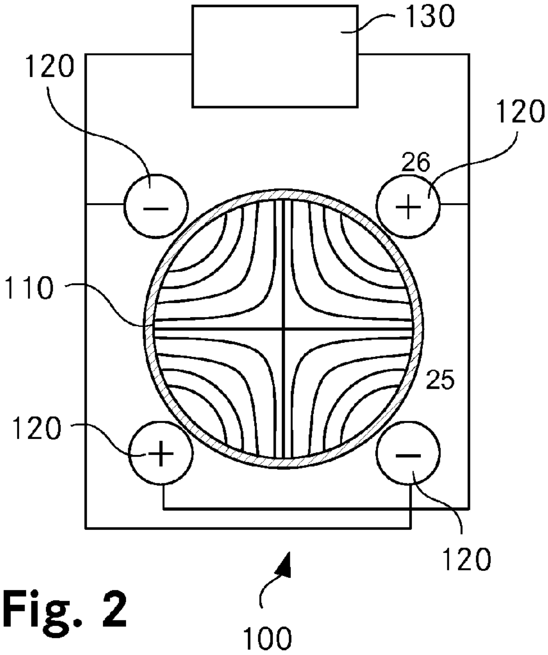
FIG. 2 is a radial cross-section of the ion guide chamber according to the first embodiment.

The FIG. 1 shows a three-dimensional view of a first embodiment of an ion guide chamber according to the invention. The FIG. 2 shows a radial cross-section of the ion guide chamber 100 according to this embodiment. The ion guide chamber 100 comprises a tube 110 made of a resistive material, namely of doped lead silicate glass. Tubes like this are commercially available, e. g. under the name "FieldMaster™" from Burle Electro-Optics Inc., Sturbridge Mass. (USA). The employed tube has a length of 150 mm, an outside diameter of 63.50 mm and an inside diameter of 48.26 mm. The resistance measured between a first axial end of the tube 110 and the opposing second axial end amounts to 100 MΩ. The employed tube features a resistive layer on its inside. Usual tubes that are commercially available feature resistive layers on their inside as well as on their outside. Therefore, if such a tube having two layers is employed the outside layer is preferably at least partially removed.

The ion guide chamber 100 further comprises four cylindrical rod electrodes 120 that are oriented in parallel to the tube 110 and that are arranged in equal angular distances from each other, surrounding the tube 110. The four rod electrodes 120 are fed by an RF generating device 130, where two opposite rod electrodes 120 each are connected in parallel. Between neighboring electrodes an RF-only voltage $$U(t)=V\cos(\omega t)$$

is connected, provided by the RF generating device 130. Thereby the RF generating device 130 together with the rod electrodes 120 generates an RF multi pole field. Surprisingly, tests have shown that this RF field penetrates through the tube 110 and is therefore present inside the tube 110, as diagrammatically indicated in FIG. 2. The RF multi pole field is used for focusing of ions in the center axis 114 of the chamber. The oscillatory inhomogeneous electrical field forms an effective potential which is proportional to $E^2$, where E is the amplitude of the electrical field strength oscillations.

The resistive regions of the two longitudinal ends of the tube 110 are connected to the opposite poles of a DC voltage generating device 140 such that a voltage U is impressed on the tube 110, accelerating charged particles injected into the tube 110.

Figure 3:
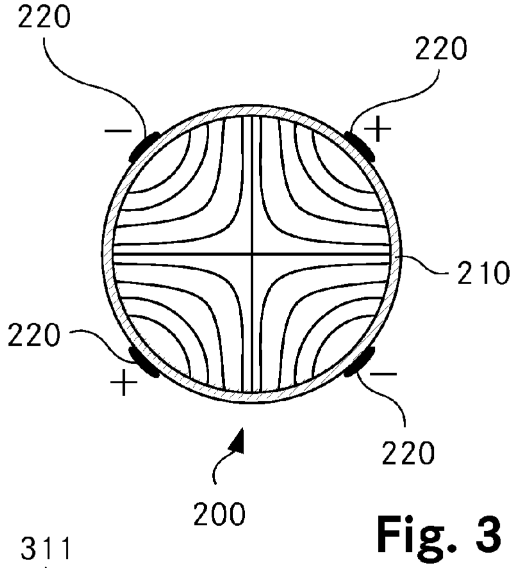
FIG. 3 is a radial cross-section of a second embodiment of an ion guide chamber according to the invention.

FIG. 3 shows a radial cross-section of a second embodiment of an ion guide chamber according to the invention. Again, the ion guide chamber 200 comprises a tube 210 as described above, in connection with FIGS. 1 and 2. In contrast to the first embodiment the RF electrodes are constituted by conducting layers 220 applied onto the outer surface of the tube 210. The conducting layers representing the four electrodes are applied in a distance from each other. Their layout may correspond to the four-rod arrangement shown in FIG. 1, i. e. the layers may run substantially parallel to the tube axis. Again, two opposite conducting layers 220 each are connected in parallel. The RF generating device together with the layers 220 generates an RF multi pole field penetrating through the tube 210.

Figure 4:
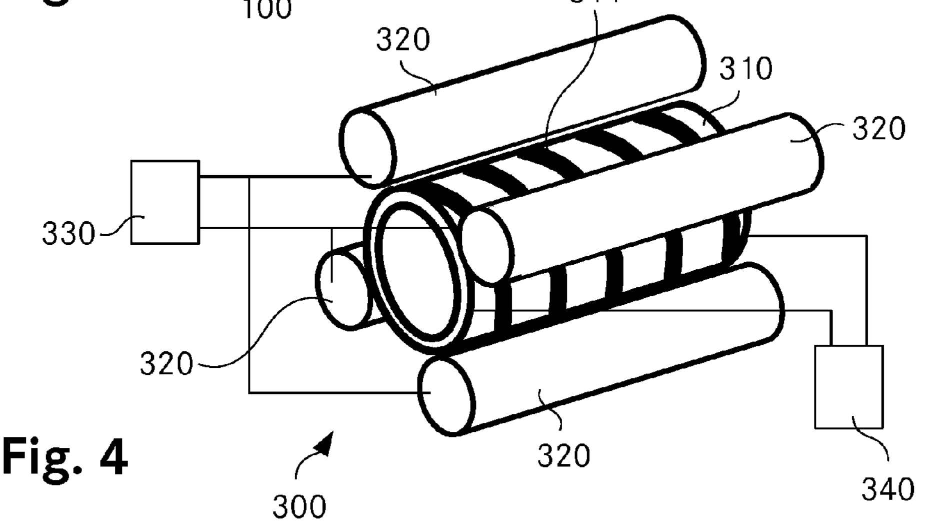
FIG. 4 is a three-dimensional view of a third embodiment of an ion guide chamber according to the invention.

FIG. 4 shows a three-dimensional view of a third embodiment of an ion guide chamber according to the invention. Substantially, it corresponds to the first embodiment illustrated by FIGS. 1 and 2. In contrast to that embodiment, however, the tube 310 of the ion guide chamber 300 is made from an isolating material, namely usual isolating glass. On the outer surface of the tube a resistive layer 311 is applied. The form of the resistive layer 311 is helicoid, it extends form a first end of the tube 310 to the opposite second end, surrounding the tube 310 several times. Again, the total resistance of the resistive layer 311 measured from one longitudinal end to the other amounts to about 100 MΩ.

Again, four rod electrodes 320 are employed, fed by an RF generating device 330, where two opposite rod electrodes 320 each are connected in parallel. The two longitudinal ends of the resistive layer 311 are connected to the opposite poles of a DC voltage generating device 340.

Figure 5:
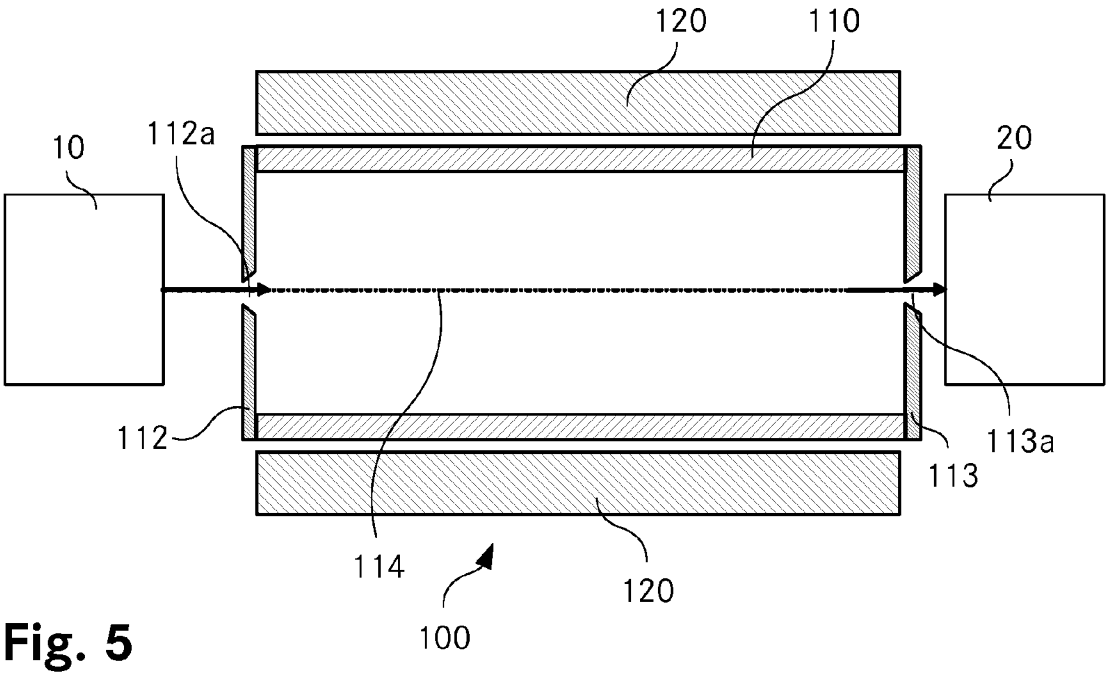
FIG. 5 is a schematic illustration of the first embodiment of the ion guide chamber employed as an interface connecting a high pressure ion source to a low pressure mass analyzer.
Figure 6:
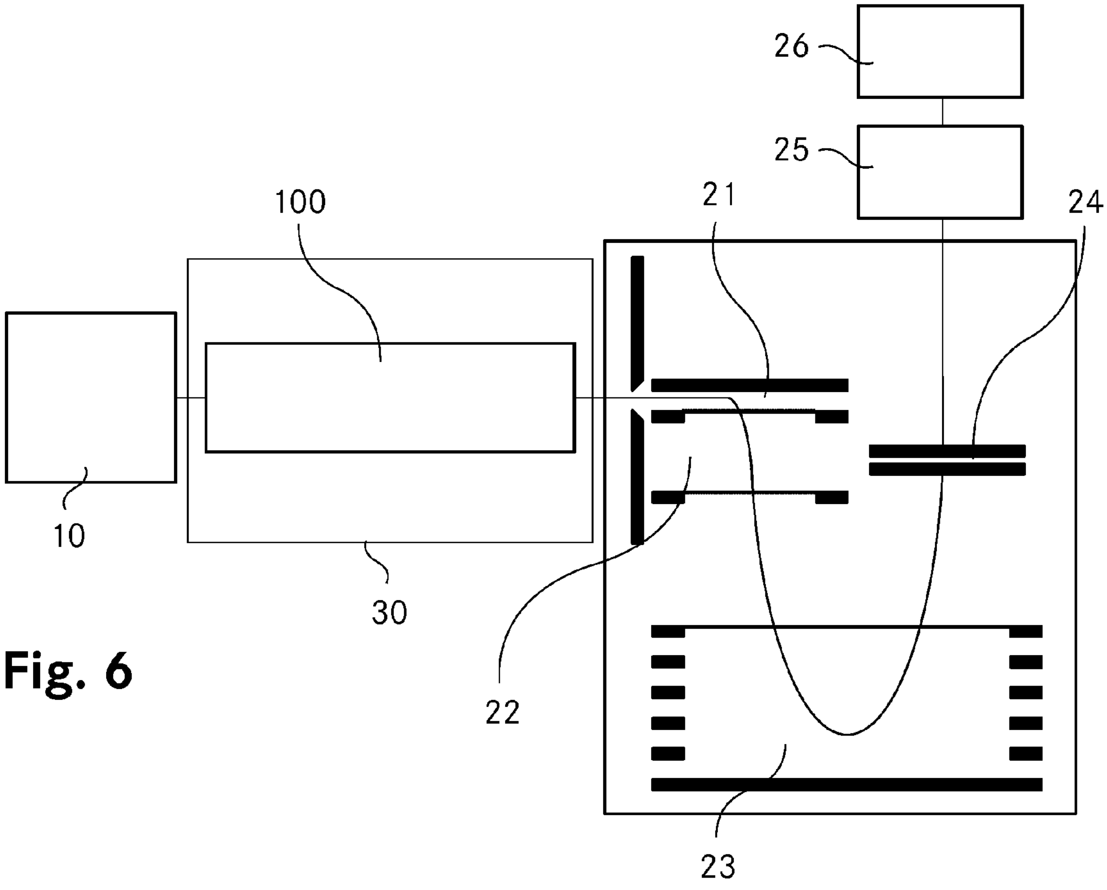
FIG. 6 is a block diagram representing the situation in FIG. 5.

FIG. 5 is a schematic illustration of the first embodiment of the ion guide chamber 100 employed as an interface connecting a high pressure ion source 10 to a low pressure time-of-flight mass spectrometer (TOFMS) 20. FIG. 6 is a block diagram representing the situation in FIG. 5

Downstream of a high pressure ion source 10 an interface 30 comprising an ion guide chamber 100 is arranged. In FIG. 5, the ion guide chamber 100 is represented in a longitudinal section running through the chamber main axis. As displayed in FIGS. 1 and 2, the ion guide chamber 100 features a cylindrical tube 110 made of a resistive material and having the above mentioned dimensions as well as four cylindrical rod electrodes 120 that are oriented in parallel to the tube 110 and that are arranged in equal angular distances from each other, surrounding the tube 110. On its two face sides the tube 110 is provided with caps 112, 113 having small central orifices 112*a*, 113*a*. Again, the rod electrodes 120 connected to an RF generating device impose a multipole RF field to the interior of the tube 110.

The ions enter the tube 110 through the small central orifice 112*a* or capillary in the cap 112 that serves as a pressure reduction stage from the high pressure ion source 10 to the chamber of the tube 110. The analyte ions are then confined to the center axis 114 by the RF field produced by the RF rod electrodes 120. At the same time, a field along the tube 110 is used for transporting the ions towards small central orifice 113*a* or capillary. Ions can exit the small central orifice 113*a* with better probability because they are cooled by the elevated pressure in the tube 110 and they are contained to the center axis 114 by the RF field. The gas pressure within the tube 110 is around 10 Pa (0.1 mbar). The voltage U for generating the transport field is chosen to be 100 V.

The ions injected into to the interface 30 are fed to a low pressure TOFMS 20. In an extraction chamber 21 of the low pressure TOFMS 20 the ions are orthogonally extracted from the primary ion beam into the low pressure TOFMS 20. Accelerated by grids 22 the ions traverse the reaction chamber 40, passing a reflector 23, and finally hit a detector 24. The detector 24 is connected to data acquisition system 25, which in turn is connected to a computer 26 for further processing of the data.

In this arrangement, the ion guide chamber 100 has the purpose of cooling the injected ions as well as focusing them towards the chamber axis in order to ensure that a maximum of the ions generated by the high pressure ion source 10 may be fed to the low pressure TOFMS 20.

Figure 7:
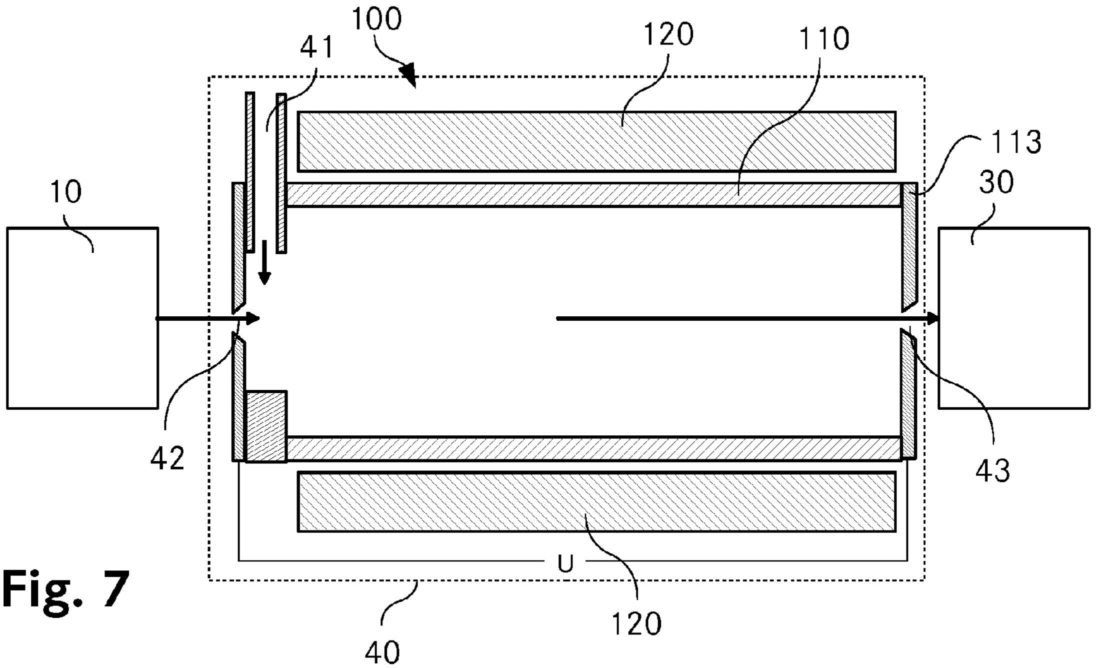
FIG. 7 is a schematic illustration of the first embodiment of the ion guide chamber employed as a reaction chamber.
Figure 8:
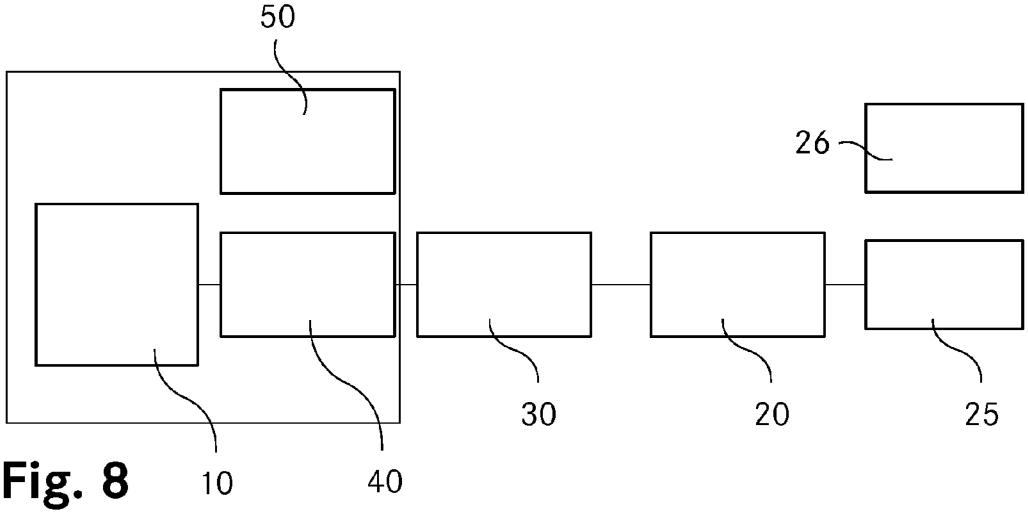
FIG. 8 is a block diagram representing the situation in FIG. 7.

FIG. 7 is a schematic illustration of the first embodiment of the ion guide chamber employed as a reaction chamber. FIG. 8 is a block diagram representing the situation in FIG. 7.

Under elevated pressure, an ion beam is generated by the high pressure ion source 10. The reaction chamber 40 receives these primary ions from the high pressure ion source 10, lets them react with analyte gas provided by a gas source 50 to produce analyte ions. For this purpose, the analyte molecules enter through a lateral sample inlet 41 into reaction chamber 40 and then are ionized by reactions with primary particles entering the reaction chamber 40 from the high pressure ion source 10 through the reaction chamber entrance 42. The primary beam particles may be molecules or ions, sometimes in charged or excited form. The primary beam may also consist of photons. The primary particles P then react with the analyte A in order to ionize the analyte by chemical reactions. The primary particles P do not react with matrix particles M in which the analyte ions A are embedded. After reacting, the analyte ions as well as the remaining primary ions are transported towards the exit 43.

Afterwards, these ions are transported through the differential pumping interface 30 towards the low pressure TOFMS 20. The transport field is generated by an applied voltage of about 1 kV. Varying this voltage allows for controlling the reaction process: If the voltage is increased the generation of water clusters is inhibited. Preferably, the interface 30 is designed as described above, in connection with FIG. 6, i. e. the arrangement displayed in FIG. 8 comprises two ion guide chambers according to the invention, one of those used as a reaction chamber the other is part of the interface 30. Again, the low pressure TOFMS 20 is connected to data acquisition system 25, which in turn is connected to a computer 26 for further processing of the data.

In prior art solutions, there are two problems that can limit the sensitivity of this method: Firstly, not all analyte ions A may find the exit due to their diffusion in the gas. This diffusion will statistically move the ions off the reactor chamber axis and thereby they will hit the exit electrode instead of the exit orifice. Furthermore, contaminates C can either leak into the chamber or they can desorb from chamber wall material like o-rings or electrode rings.

In the embodiment according to the invention the contamination is reduced by replacing the usual rings and o-rings with the tube 110 made of high resistive glass. When a Potential U is applied along the tube 110 an ion transporting field will be established. To increase the transmission of ions through the exit orifice 43 or exit capillary (not shown) or exit matrix (not shown) an RF field is super imposed to the ion transport field. The RF containment field is generated outside the glass tube 110 as described above in order to avoid contamination problems.

Figure 9:
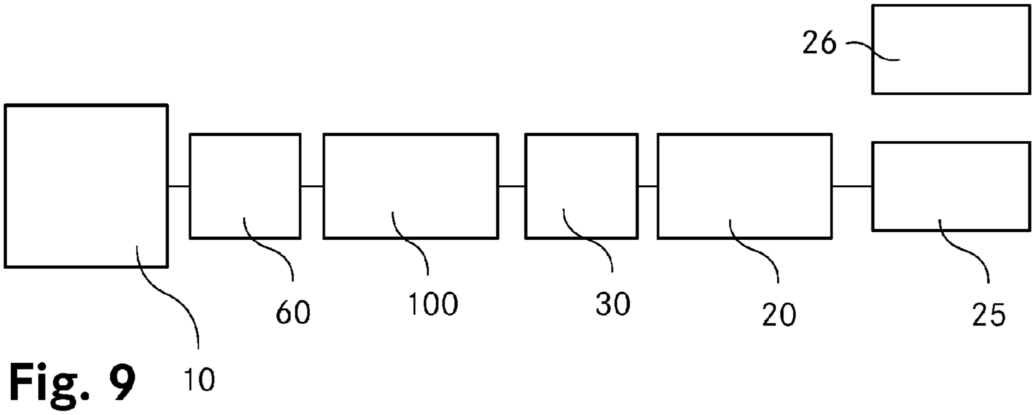
FIG. 9 is a block diagram illustrating the application of the inventive ion guide chamber as an ion mobility separation device.

FIG. 9 is a block diagram illustrating the application of the inventive ion guide chamber as an ion mobility separation device. The displayed arrangement features a high pressure ion source 10 as well as an inventive ion guide chamber 100 connected to the high pressure ion source 10 via an ion gate 60. The ion guide chamber 100 serves as an ion mobility separation device and is again connected to an interface 30 which is in turn connected to a low pressure TOFMS 20, a data acquisition system 25 and a computer 26.

The ion gate 60 arranged upstream of the ion guide chamber 100 is operated in a pulsed manner such that the analyte ions enter the ion guide tube in a corresponding pulsed manner. The ion guide tube is operated at elevated pressure such that the ions injected into the ion guide tube are separated according to their collision cross section and charge state. The voltage applied between the entrance and the exit of the ion guide chamber is chosen to be 20 kV. The different ion species have different drift times in the tube. At the exit of the tube they are transferred into the mass spectrometer where their m/Q is analyzed. Due to the RF focusing field the chamber of this invention allows for minimal losses due to diffusion. Furthermore, the inventive layout allows for creating a very homogenous transporting field which improves the performance of the ion mobility separation stage.

Furthermore, the inventive device may be used as a mass filter for eliminating unwanted ion species. In this operation mode a field generating device is employed which is designed in such a way that it generates the primary confining field described above, capable of transmitting ions towards the time-of-flight mass spectrometer as well as one or several RF frequencies superimposed with said primary field. These RF frequencies match oscillation frequencies of ions belonging to one or several narrow bands of m/Q (i. e. preferably $\Delta(m/Q)=1$ or 2). The incoming ions are injected into the primary confining field transmitting the ions towards the time-of-flight mass spectrometer. Ions belonging to said narrow bands of m/Q are resonantly excited and finally ejected from a confining area of the primary field. Accordingly, only the desired ions that do not belong to the narrow bands of m/Q reach the time-of-flight mass spectrometer coupled to the mass filter. The process is described in more detail in the European Patent Application No. 06 405 519.7 of 14 Dec. 2006 owned by TOFWERK AG.

The selectivity of filtering can be adjusted by changing parameters of the excitation RF fields. Several additional excitation RF fields can be applied simultaneously in order to eliminate several species or several m/Q ranges. Furthermore, excitation RF amplitudes may be increased in order to eliminate wider m/Q ranges.

Alternatively, if the ion species to be filtered out is of a lower mass than all the interesting species being generated by the ion source, a low mass cut-off of a suitable primary confining field is used to eliminate the corresponding low m/Q range of ions.

The invention is not restricted to the embodiments discussed above. In particular the geometry of the inventive ion guide chamber as well as the electric parameters given above are subject to variation. For example, the voltages indicated may be adapted to the technical function of the guide chamber (e. g. focusing/cooling, reaction, mobility separation etc.) as well as to the chamber's geometry and electric properties (in particular to the length and diameter of the chamber as well as to the total resistance). Furthermore, instead of a gas-tight chamber a non-gas-tight chamber may be used that is arranged within a vacuum chamber, together with the surrounding elements of the apparatus.

In the case of using the ion guide chamber as an interface connecting a high pressure ion source to a low pressure mass analyzer it may be advantageous to arrange a plurality of ion guide chambers in succession, linked by capillaries, whereas the pressure is gradually reduced from one ion guide to the next one. In the case of using the chamber as an ion mobility separation device the analyte ions may be directly generated in a pulsed manner. This saves the ion gate.

In summary, it is to be noted that the invention creates an ion guide chamber that is mechanically simple, cost-efficient and that allows for good transmission of analyte ions generated at elevated pressure to the mass spectrometer, undisturbed by discharges or electrode contamination, thereby ensuring high sensitivity and detection limits of the mass analysis.

While the forms of apparatus herein described constitutes a preferred embodiments of this invention, it is to be understood that the invention is not limited to these precise forms of apparatus, and that changes may be made therein without departing from the scope of the invention which is defined in the appended claims.

What is claimed is:

1. An ion guide chamber, comprising an elongate chamber;

at least one first electrode for generating a field for transporting ions along said elongate chamber;

at least one second electrode for generating a field for focusing ions within said elongate chamber;

wherein said elongate chamber comprises a resistive structure extending substantially along a main axis of said elongate chamber, whereas said at least one first electrode is constituted by said resistive structure; and in that said at least one second electrode is arranged outside said elongate chamber;

said at least one first electrode is adapted to permit transporting said ions and said at least one second electrode is adapted to focusing said ions within said elongate chamber, thereby providing transporting of ions and focusing of ions at the same time within a single ion guide chamber.

2. The ion guide chamber as recited in claim 1, wherein said elongate chamber is constituted by a glass tube, in particular of circular cross-section.

3. The ion guide chamber as recited in claim 1, wherein said resistive structure is constituted by a resistive coating on the inside and/or outside of the elongate chamber.

4. The ion guide chamber as recited in claim 1, wherein said elongate chamber is built from a resistive material.

5. The ion guide chamber as recited in claim 1, wherein a resistance measured along a chamber main axis, between a first end of said resistive structure and a second end of said resistive structure opposite to said first end is at least 1 MΩ, preferably at least 5 MΩ.

6. The ion guide chamber as recited in claim 1, wherein said at least one second electrode comprises a set of elongated rods arranged substantially parallel to said elongated chamber.

7. The ion guide chamber as recited in claim 1, wherein said at least one second electrode is constituted by at least one electrically conductive or semi-conductive coated or painted surface region on an outside of said elongated chamber.

8. The ion guide chamber as recited in claim 1, wherein said field for transporting ions runs parallel to a chamber main axis and in that said field for focusing ions is a RF multipole field generating an effective potential confining ions to a region neighboring said chamber main axis.

9. The ion guide chamber as recited in claim 1, wherein a first inlet for analyte molecules and by a second inlet for a primary particle beam.

10. An apparatus for mass analysis comprising:

at least one ion guide chamber as recited in claim 1;

a first voltage generating device connected to said at least one first electrode for generating said field for transporting ions;

a second voltage generating device connected to said at least one second electrode for generating said field for focusing ions; and a mass spectrometer, in particular a time-of-flight mass spectrometer, arranged downstream of said at least one ion guide chamber;

said at least one first electrode is adapted to permit transporting said ions and said at least one second electrode is adapted to focusing said ions within said elongate chamber, thereby separating transporting of ions from focusing of ions.

11. The apparatus for mass analysis as recited in claim 10, further comprising a high pressure ion source arranged upstream of said at least one ion guide chamber.

12. The apparatus for mass analysis as recited in claim 11, wherein an ion gate is arranged upstream of the at least one ion guide chamber and in that the ion guide chamber is operated at elevated pressure such that ions injected into said ion guide chamber are separated according to their collision cross section and charge state.

13. The apparatus for mass analysis as recited in claim 10, wherein said ion guide chamber is operated as an ion source.

14. The apparatus for mass analysis as recited in claim 11, wherein said second voltage generating device is capable of generating a rotating multipole field at said at least one second electrode.

15. The apparatus for mass analysis as recited in claim 11, wherein said second voltage generating device is capable of generating an additional excitation RF field to be super-positioned to a confining RF field.

16. The apparatus for mass analysis as recited in claim 15, wherein said second voltage generating device is designed in such a way that a superimposed RF frequency is generated such that ions belonging to one or several narrow bands of m/Q are exited onto an orbit around a center axis.

17. The ion guide chamber as recited in claim 1, wherein said elongate chamber is gas-tight.

* * * * *